DIGITAL STORAGE VOICE MESSAGE GENERATOR

Filed March 26, 1965 5 Sheets-Sheet 1

INVENTOR
LYLE H. LEE
By Arthur Decker
ATTORNEY

DIGITAL STORAGE VOICE MESSAGE GENERATOR

Aug. 20, 1968 L. H. LEE 3,398,241

DIGITAL STORAGE VOICE MESSAGE GENERATOR

Filed March 26, 1965 5 Sheets-Sheet 3

United States Patent Office 3,398,241
Patented Aug. 20, 1968

3,398,241
DIGITAL STORAGE VOICE MESSAGE GENERATOR

Lyle H. Lee, San Jose, Calif., assignor to International Business Machines Corporation, Armonk, N.Y., a corporation of New York Filed Mar. 26, 1965, Ser. No. 443,030
9 Claims. (Cl. 179—1)

ABSTRACT OF THE DISCLOSURE

A voice signal generator, wherein a digital code representing a predetermined word is stored on a recirculating storage in interleaved form along with an address whereby, by sensing the address, the individual segments of the word can be read from the store and converted to an analog signal.

This invention relates to recording and reproducing of analog signals and, more particularly, to a signal handling system which converts an incoming continuously variable signal to digital form and retains the digital form in recirculating storage in such fashion that it may be accessed without appreciable loss of original fidelity.

An admirable application for devices of which the invention is typical is the handling of audio signals of about 3 kilocycles bandwidth, as required in the communications industry. Specifically, it is at times necessary to store a dictionary of spoken words such that individual words may be addressed in sequence and thereby generate a spoken plural-word message. Cyclic magnetic storage of the words is common, typical structure being revolving drums or disks with magnetizable surfaces in proximity to magnetic heads which define storage channels or tracks and a selection network sequentially operated to excite the heads. If a channel or track is arranged for storage of one word of the dictionary, then the word is repeatedly available, the word repetition rate being a submultiple of the drum or disk velocity. The submultiple depends upon the word length, but the speed of reproduction is established by the velocity and, therefore, if fidelity is to be preserved, recording and reproducing should be done at the same velocity. This velocity should be compatible with the speech frequencies (3 kc. bandwidth) and, thus, it is apparent that a slowly moving drum or disk is most appropriate. However, this type of system suffers certain disadvantages, mainly because the storage medium is slow: the time for the repetitive accesses is increased and, since recording is an analog form, the reproduction from a practical system is generally characterized by an unnatural "cadence" which can be avoided only by introducing additional equipment and attendant expense.

One approach to avoiding these disadvantages is to provide a speed change between analog recording and reproducing of about 50 to 1; this usually involves some form of intermediate storage of the composed message which will reproduce it at a rate geared to the absorption of the listener. Such systems have been found initially costly and difficult to maintain since, typically, the speed ratio is achieved by mechanical means.

The present invention also provides a speed ratio between recording and reproducing but does so by recording in digital form, selecting equipment very carefully, and utilizing its inherent operating characteristics fully, thereby achieving ratios of as high as 150 to 1.

It is a further object of this invention to adopt digital techniques to audible reproduction of messages, thereby achieving simplicity, reliability and versatility with regard to message format.

Briefly, the embodiment of this invention to be described also uses recirculating storage for the words of the dictionary but this is preferably in the form of synchronized magnetostrictive delay lines which cycle a digital code representing predetermined word amplitude levels derived from an analog recording sampled at spaced intervals. Storage in a delay line is in "interleaved" form, i.e., the code is separated into equal sectors of samples, the samples of a sector being spaced such that the samples of all other sectors occur at intermediate positions. Thus, although the recirculating rate of the line is quite high (i.e., the storage is at high speed), the rate of sensing sequential samples and sectors (i.e., of reproducing the word code in its proper format) is made considerably lower. A plurality of delay lines of the same length is used, one for each word or word part, and the digital codes therein are gated to an output converter and integrator in sequence according to the message, the sequence being established by an accessing (address) register and decoder at the request of an outside source. Also involved is a timing circuit, including delay lines, to keep the readout from the storage delay lines synchronous and identify their entry and exit points.

The foregoing and other objects, features and advantages of the invention will be apparent from the following more particular description of a preferred embodiment of the invention, as illustrated in the accompanying drawings.

Figure 1:
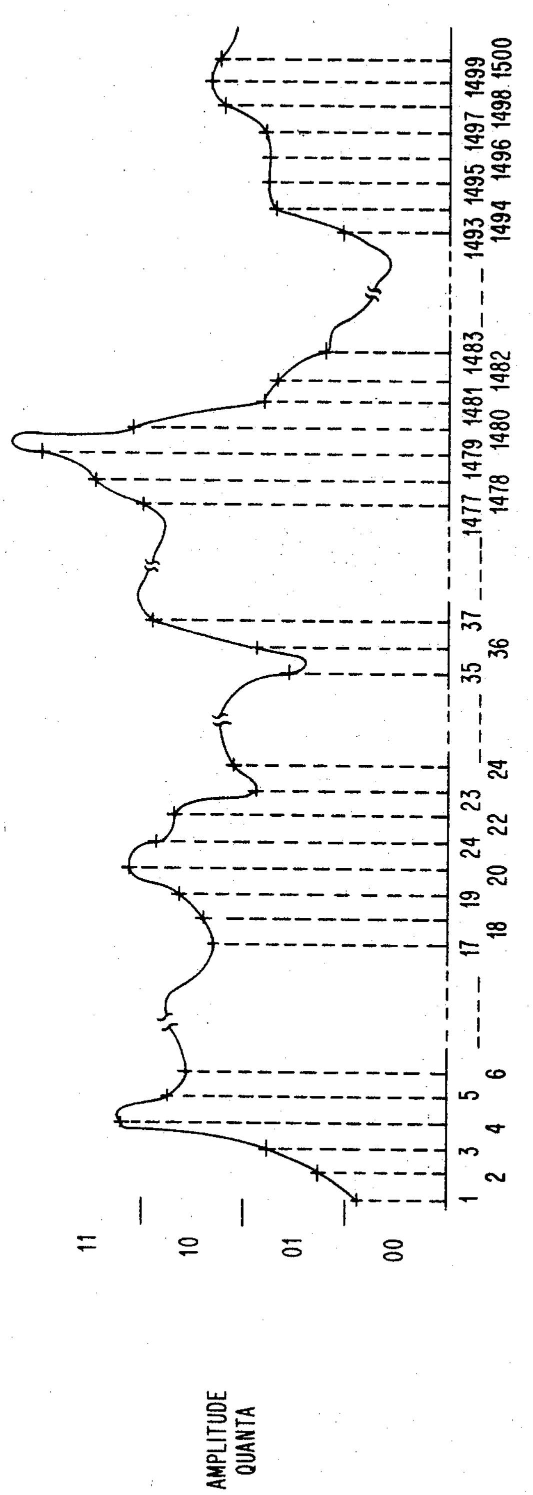
FIGURE 1 shows the analog pattern of a word marked by 1500 equal-period sample points along the abscissa and by quantum levels along the ordinate.
Figure 4:
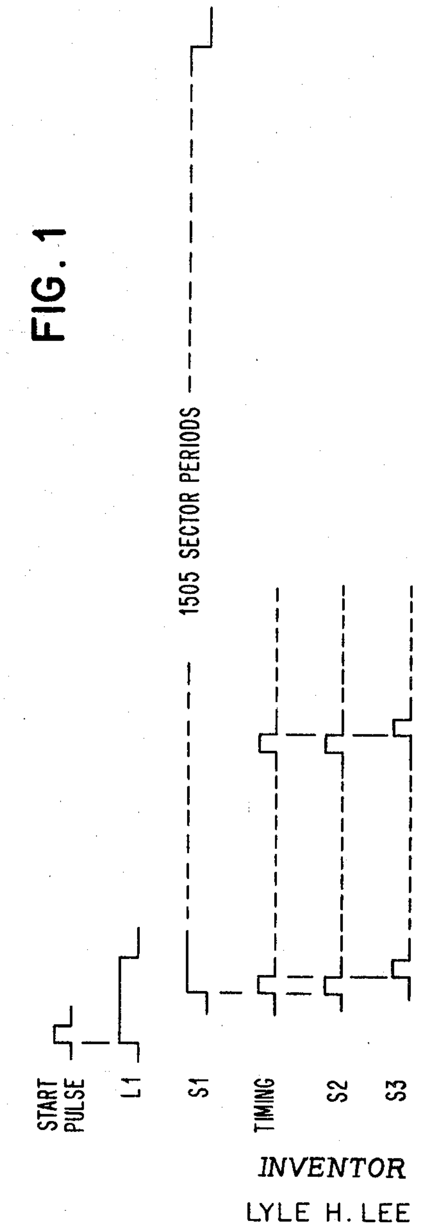
Figure 3:
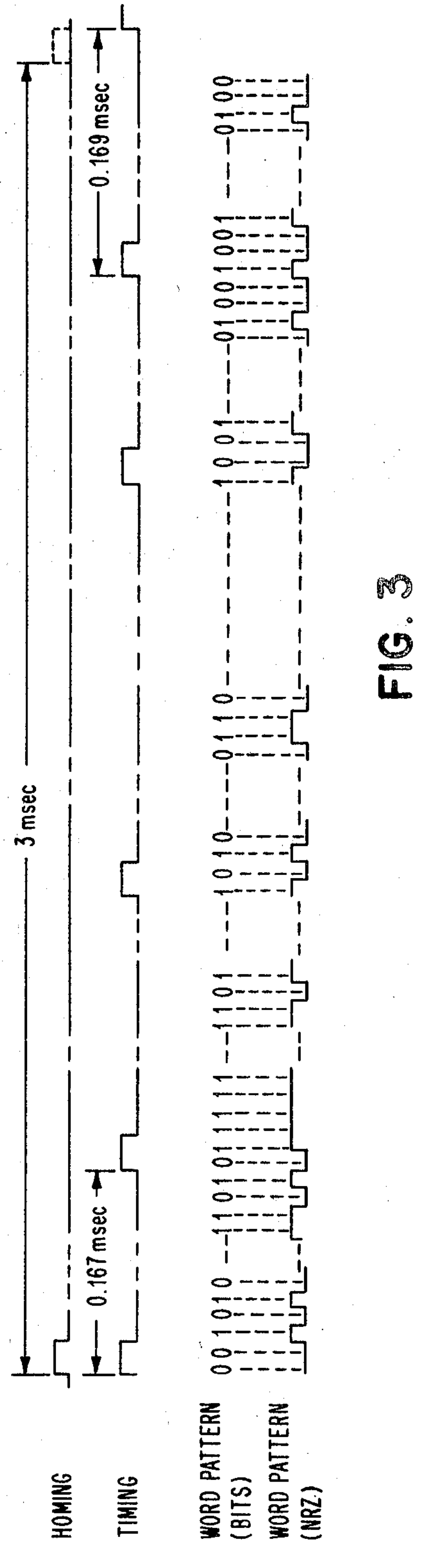
Figure 5:
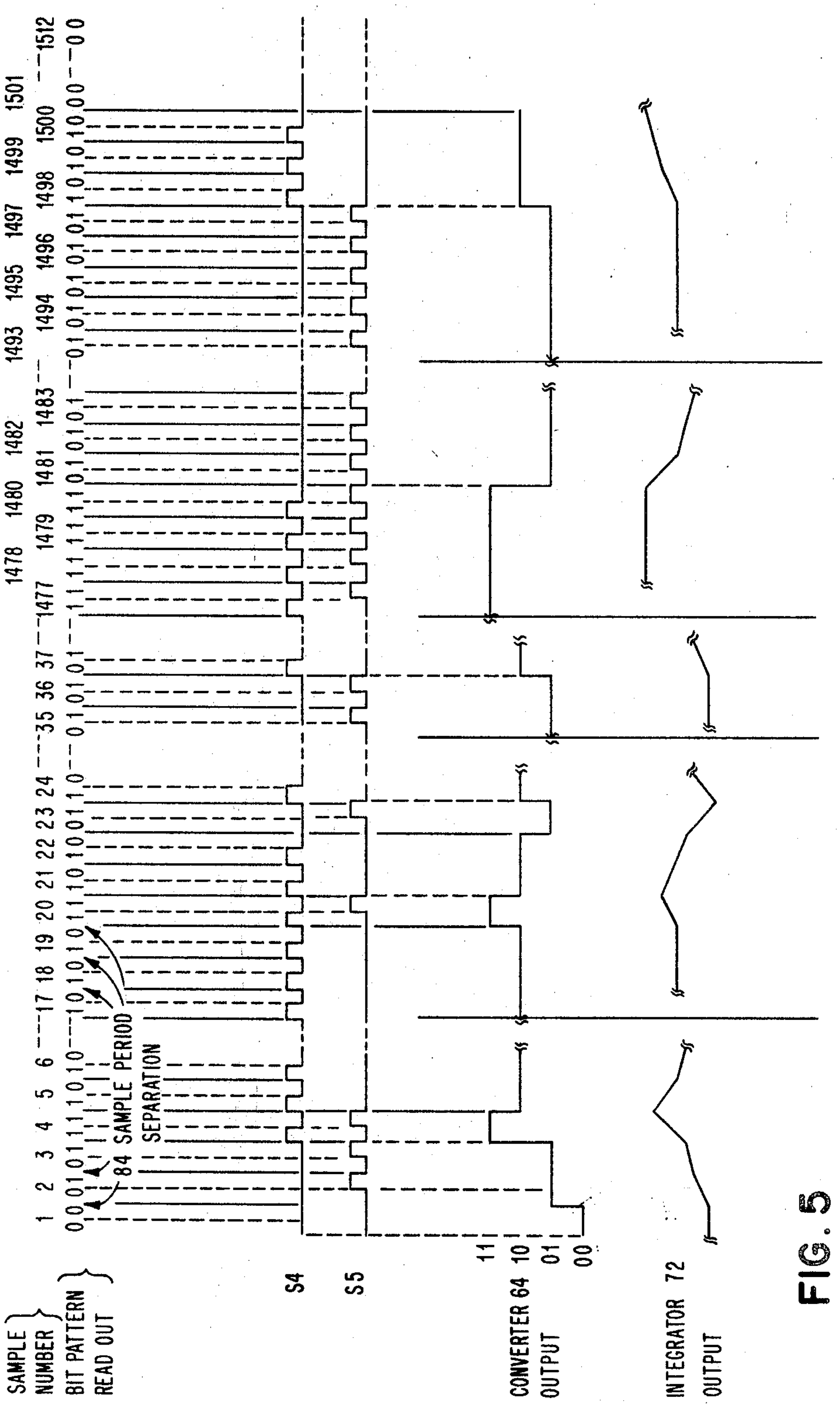
Figure 6:
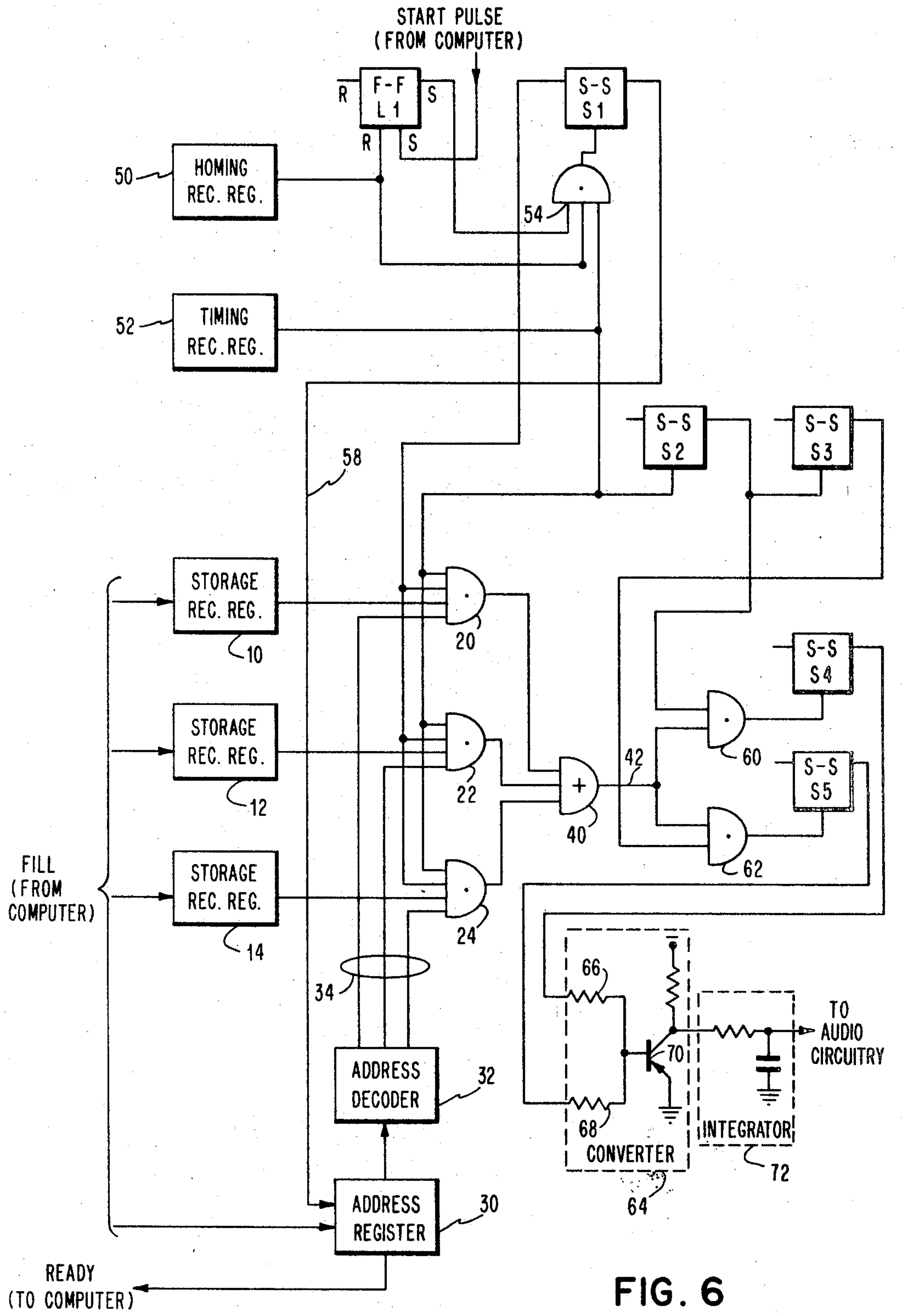
Figure 7:
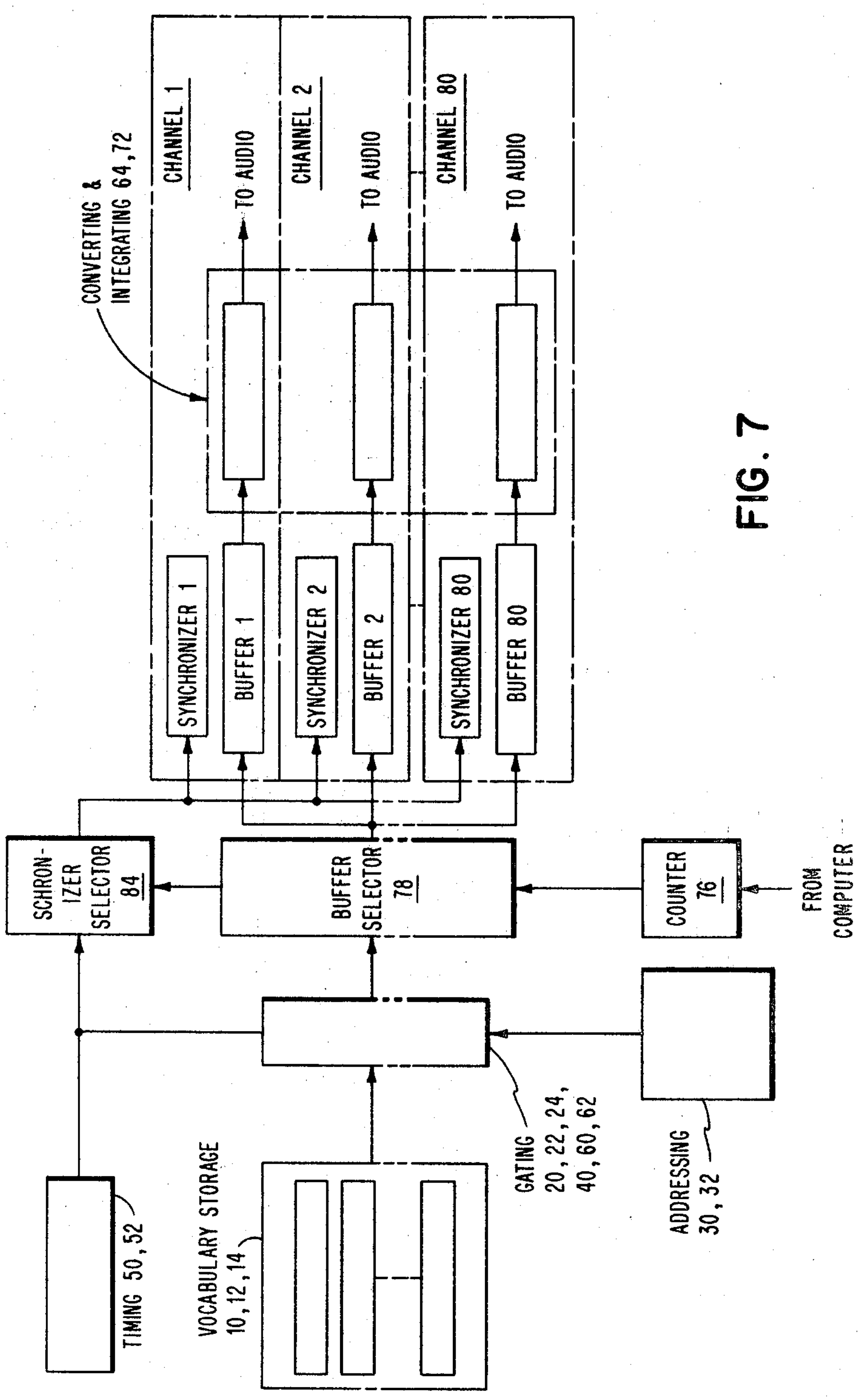

FIGURE 3 diagrams the read-out from the homing and timing recirculating registers together with the pattern corresponding to the word of FIGURE 1 as read out from a storage recirculating register;

FIGURE 4 shows the operation of some of the components of the invention involved in providing proper timing and sequencing;

FIGURE 5 presents representations of the operation of the system of the invention with regard to the example of FIGURES 1 and 3;

FIGURE 6 is a diagram, both in block and schematic forms, of a preferred embodiment of the system of the invention; and FIGURE 7 is a diagram of a multiple channel information retrieval system embodying the invention.

Referring now to FIGURE 1, here is shown the analog (aural) time-amplitude pattern of a spoken word as it might be seen on an oscilloscope, for instance. The time duration of the word is divided into equally spaced periods separated by 1500 points of sampling of the instantaneous amplitude, marked along the abscissa of the diagram. The system to be described is digital and, consequently, the electrical signal corresponding to the word is quantized to a number of predetermined amplitude levels. Here four amplitude quanta, designated in binary notation along the ordinate, are given, although it should be understood that the fidelity of reproduction from the system is directly related to the number of levels at which quantization occurs as well as the number of samples taken. Four levels have been selected here for simplified teaching of the invention and these require but two bits to represent a level; eight-level quantizing would require three bits, but would provide increased fidelity, and sixteen-level quantizing, requiring four bits, might be considered as practically distortionless.

Figure 2:
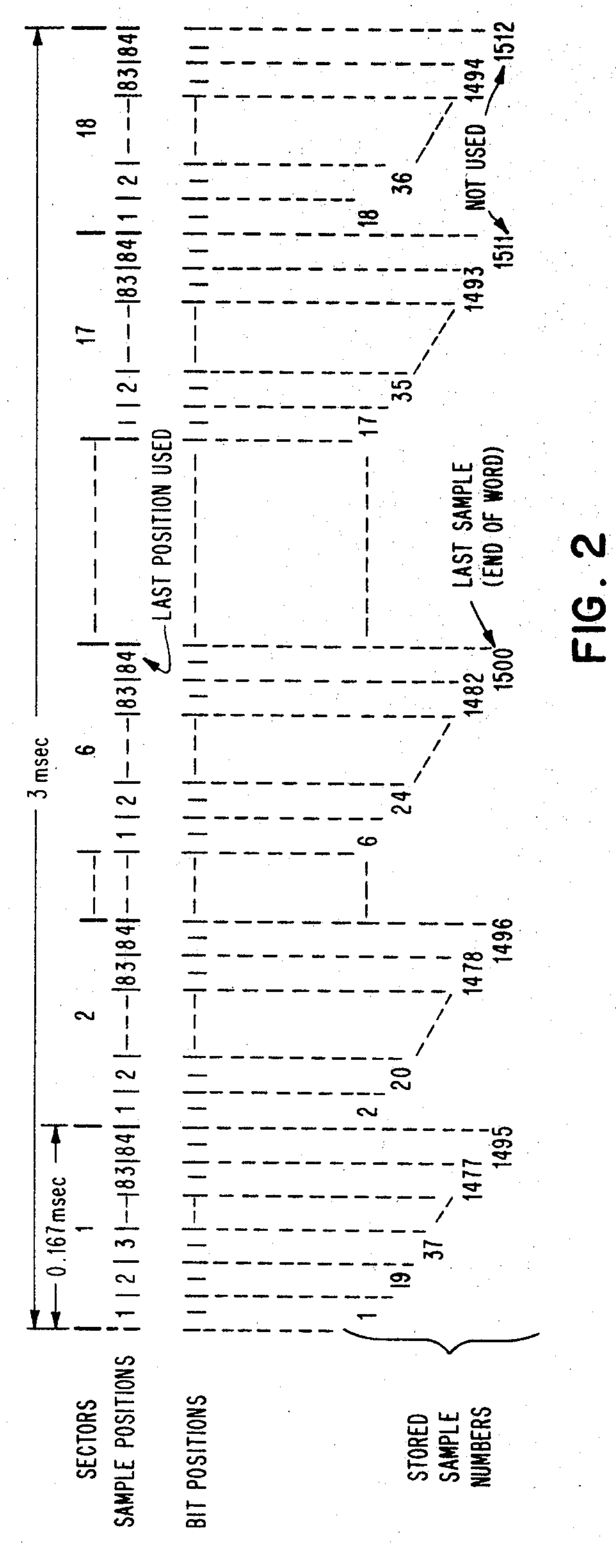
FIGURE 2 shows the arrangement for word storage in a recirculating register.

The 1500 amplitude quanta corresponding to a word are stored in a recirculating register, preferably taking the form of a magnetostrictive delay line. It has been found that a register with a recirculation period of about 3 msec. will suffice to provide storage of about ¼ second, suitable for most single spoken syllables, and satisfactory reproduction of longer words and sentences are obtained by accessing a plurality of registers in proper sequence. Accordingly, FIGURE 2 shows the arrangement for storage in a recirculating register as partitioned into eighteen equal sectors, each divided into 84 positions for holding pairs of bits (samples) representing the amplitude quanta of FIGURE 1.

It has been mentioned that storage is interleaved; that is, sequential samples are not stored in sequentially sensed sample positions in a register, but separated by a number of other samples. This concept is also illustrated in FIGURE 2, in which the sample numbers of FIGURE 1 are indicated below the sample positions in which they are stored. It is seen that sequential samples are separated by 83 other samples (i.e., are one sector apart). Thus, sample number 1 is stored in sector 1 position 1, sample number 2 is stored in sector 2 position 1, sample number 18 is in sector 18 position 1, sample number 19 is in sector 1 position 2, etc. and the last quantum (sample number 1500) is stored in the register at sector 6 position 84; positions 84 of sectors 7 through 18 are not used (i.e., are filled with zeros). This provides a time interval of twelve sector periods (about 0.2 msec.) during which no samples of the original recording are being sensed; sequential accessing of a plurality of registers, under the control of a computer, is accomplished at this time.

As a result of this storage pattern, sequential sample read out will occur at 1/18 of the recirculating interval of the register (approximately one sample every 0.167 msec.), or, in other words, for each recirculation, 1/84 part of a word is read out, thereby achieving a storage-reproduction speed change of 84:1.

The two lower lines of FIGURE 3 present the word pattern corresponding to the word of FIGURE 1 as read out from a storage register, both in the 0–1 bit designation and in non-return-to-zero waveshape form, well known in computer technology. Also shown in FIGURE 3 is a representation of the content of a pair of registers arranged to recirculate in synchronism with the storage recirculating register. One recirculation of the homing register provides a pulse one sample period (2 bit positions) long, which appears at its output coincident with sector one sample period one of a storage register and controls the accessing of storage registers. One recirculation of the timing register provides a set of pulses one sample period long, one of which coincides with sample periods 1 followed by a set of pulses coincident with sample periods 2, etc. Otherwise stated, the recirculation period for the timing register is 84 times that of the homing and storage registers and during this time, the former emits sets of 18 equispaced pulses, the sets being separated by an 85 sample period duration. Readout from a storage register occurs, as will be shown, coincident with the timing pulses; as a result, the first recirculation of a storage register will emit the codes for samples in sample positions 1 of each sector, the second recirculation will emit those for sample positions 2, . . . and the 84th recirculation will emit those for sample positions 84, after which the homing and timing pulses will again coincide, and another access will be initiated. It is apparent that the sample number read out will increment by one for each recirculation of the storage register.

Although this system of synchronization among the homing, timing and storage registers will provide proper readout of data, it may be regarded as utilizing the latter register as the standard of synchronization in that the former two registers are coordinated therewith. It may be desirable, from an engineering feasibility standpoint, to operate differently and provide standardization to the operation of the timing register, for which the total cyclic duration is made much less than indicated in FIGURE 3, and introduce precession of storage register readout by reducing the recirculation delay of the storage and homing registers by one sample period. Such operation is indicated in the following table.

| Sample Period | Timing Register Output | Homing Register Output | Storage Register Sector | Storage Register Sample Position |
|---|---|---|---|---|
| 1 | Pulse | Pulse | 1 | 1 |
| . | | | . | . |
| . | | | . | . |
| . | | | . | . |
| 85 | Pulse | | 2 | 1 |
| 169 | do | | 3 | 1 |
| 253 | do | | 4 | 1 |
| . | | | . | . |
| . | | | . | . |
| . | | | . | . |
| 1,261 | Pulse | | 16 | 1 |
| 1,345 | do | | 17 | 1 |
| 1,429 | do | | 18 | 1 |
| 1,511 | | | 18 | 83 |
| 1,512 | | Pulse | 1 | 1 |
| 1,513 | Pulse | | 1 | 2 |
| 1,514 | | | 1 | 3 |
| 3,024 | | Pulse | 1 | 1 |
| 3,025 | | | 1 | 2 |
| 3,026 | Pulse | | 1 | 3 |
| 3,027 | | | 1 | 4 |
| . | | | . | . |
| . | | | . | . |
| . | | | . | . |
| 127,008 | Pulse (1,512 cycles) | Pulse (84 cycles) | 1 | 1 (84 cycles) |

The circuit of the invention is shown in FIGURE 6, which indicates association, for purposes of control, with a computer. The control comprises a pulse signal which initiates operation of circuit (start pulse from the computer) and a series of coded addresses set up by the computer in address register 30. Each address specifies a particular storage recirculating register of the plurality (here, 3, comprising registers 10, 12 and 14) shown, which store, in synchronism, preselected words or word parts as entered by the computer. The addresses stored in address register 30 are fed to address decoder 32 in order of storage and it is the function of decoder 32 to energize its output lines 34, in sequence, one line for each address when a change of address is signalled on line 58. Lines 34 each connect to a separate AND gate 20, 22 and 24 corresponding to storage registers 10, 12 and 14, respectively. As a result, the contents of one or more of storage registers 10, 12 and 14 are passed, one at a time, to OR gate 40, which accumulates them serially on its output, line 42. When depleted of its contents, address register 30 transmits to the computer a ready signal indicating that it is prepared to receive another fill.

In continuous circulation in synchronism with storage registers 10, 12 and 14 are a pair of recirculating registers, homing register 50 and timing register 52, the operating characteristics and outputs of which have been previously described. The output of register 50 branches to the reset input of R–S flip-flop L1, the input to single shot S1, and an input to AND gate 54; the output of register 52 branches to an input to AND gates 20, 22, 24 and 54 and to the input to single-shot S2. A third input to AND gate 54 comprises the set output of flip-flop L1 which is energized by the computer start pulse at its set input. The output of AND gate 54 provides the input to single-shot S1.

As a result of these interconnections, as shown in FIGURE 4, a computer start pulse energizes the set output of flip-flop L1 and thus primes gate 54, which passes a signal to trigger single-shot S1 on coincidence of the homing and timing pulses from registers 50 and 52 (i.e., at sector 1 period 1). The unstable output of single-shot S1 feeds the third input of AND gates 20, 22 and 24, and remains, so that gates 20, 22 and 24 are continuously primed, during the read out of the 1500 samples of the storage register in which the word is stored, in particular, for 1505 sector periods. The return of single-shot S1 to its quiescent state provides the signal, on line 58, which causes address register 30 to transmit another address to decoder 32; this occurs after 1505 sector periods, i.e., subsequently to read out of a storage register and during the seventh sector period prior to the emission of another homing pulse from register 50.

The unstable output of single-shot S2 connects to the input of single shot S3 as well as to AND gate 60. Similarly, the unstable output of single shot S3 connects to AND gate 62. Both of these single-shots return to quiescence after one sample period. The second inputs to AND gates 60 and 62 are provided by line 42, the output of OR gate 40 which, as already mentioned, comprises the audio-representing binaries stored by registers 10, 12 and 14, emitted at the rate of one sample per sector period. The outputs of AND gates 60 and 62, respectively, trigger single shots S4 and S5, which feed into converter 64. As will be shown, these outputs comprise serial trains of pulses, that of signal shot S4 being the first bits of each binary code on line 42 and that of single shot S5 being the second bits. In converter 64, the former train appears across resistor 66 and the latter train appears across resistor 68. Resistor 68 is valued at half the resistivity of resistor 66 and both operate as a weighting device, i.e., current flow through resistor 68 will double that through resistor 66 for coincident pulses presented to them. Since resistors 66 and 68 are both connected at the base of transistor 70, the output at the collector of transistor 70 will be characterized by four voltage levels according to the four combinations of bits possible in a sample stored by storage registers 10, 12 and 14, a level being maintained throughout a sector period.

Converter 64 is connected to integrator 72, which functions to smooth out the voltage steps to provide an input to audio circuitry resembling the original analog signal.

An example of the operation of the invention contemplating the reproduction of the analog wave shown in FIGURE 1 and the storage of the digital equivalent, as shown in FIGURE 3, is given in FIGURE 5. The top two lines of this figure present the sample numbers and their binary values, as read out after accessing by address register 30 and address decoder 32 (FIGURE 6), from, for instance, storage register 10 through gates 20 and 40 and alternately through gates 60 and 62. Single shot S4 is triggered by coincidence of pulse outputs from single-shot S2 and gate 40 during the first halves of the sample periods corresponding to sample numbers 4, 5, 6. . . 17, 18, etc. and single shot S5 is triggered by coincidence of pulse outputs from single shot S3 and gate 40 during the sample periods corresponding to sample numbers 2, 3, 4. . . 20, 23, etc. As a result, for sample number 1, both single shots S4 and S5 are in their quiescent states, no current is drawn through resistors 66 and 68 and the output of converter 64 is at the lowest at its four voltage levels, indicated on its FIGURE 5 diagram as 00 for sector period 1. For sample numbers 2 and 3, single shot S5 pulses resistor 68 and the output level jumps to that designated as 01; for sample number 4, both single shots S4 and S5 pulse resistors 66 and 68, respectively, and a double jump occurs to level 11; for sample numbers 5 and 6, only single shot S4 pulses resistor 66 and the level drops to 10, etc. Smoothing by integrator 72 provides the output shown, and its resemblance to FIGURE 1 can be recognized.

It may be remarked that the output to the system audio circuitry shown in FIGURE 5 is far from distortionless when compared to the input shown in FIGURE 1. As previously pointed out, this is mainly a result of the number of bits chosen to repersent the amplitude quanta and the frequency at which samples are taken. These are matters of engineering specification and are accomplished by design once the system of the invention is known.

FIGURE 7 shows generically how the techniques of this invention may be incorporated into a multiple channel system wherein a plurality of audio responses may be made simultaneously to a corresponding number of requestors. In this figure, components designated in FIGURE 6 and described in connection therewith are given functional descriptors since they serve the same purposes. There is further shown a plurality of identical channels 1, 2 . . . 80, each responding to a separate requestor via individual audio circuitry. Referring, for instance, to channel 1, included is a buffer 1 and a synchronizer 1, the former to temporarily store a word or word part as received from vocabulary storage 10, 12, 14, after selection by gating 20, 22, 24, 40, 60, 62 and addressing 30, 32, and the latter to indicate the buffer fill and availability for content transfer. The buffers are selected by the computer through counter 76 and buffer selector 78 in accordance with the address with the address of the word to be stored therein. The synchronizers are selected by synchronizer selector 84 and, preferably, take the form of delay lines so that a pulse may be entered through synchronizer selector 84 from timing 50, 52 to provide the aforementioned indication.

With regard to the operation of this system, a computer-originated address effects transfer of a word from the vocabulary to, for instance, buffer 1, also similarly addressed, and a pulse is entered into synchronizer 1 coincident with the first sample of the word in buffer 1. This operation occurs in one read out of the storage register of hte vocabulary. Subsequently, synchronizer 1 signals transfer of the word from buffer 1 to the requestor through the channel converting, integrating and audio circuits. Plural simultaneous outputs are possible because of the great difference between the times of playback and buffer transfer. As an example, consider a 250 msec. word: transfer to buffer requires but 3 msec. while playback from buffer requires 250 msec. Thus, during the latter time period, about 80 words may be fed into 80 buffers and all may have their contents released simultaneously.

It may be pointed out that the above description omits details of construtcion of the components shown in block form in FIGURES 6 and 7. Such detail is considered superfluous here, inasmuch as this equipment is quite familiar to those practicing the computer arts. For instance, reference to the text Logical Design of Digital Computers by Montgomery Phister, Jr., John Wiley and Sons, Inc., New York, 1963, especially Chapter 5, will completely divulge the R-S flip-flops chosen and indicate that any of the others analyzed there would be functionally equivalent, and addressing techniques for accessing storage registers 10, 12 and 14, shown in FIGURE 6 as exemplified by address register 30 and address decoder 32, are divluged in Chapter 7, especially S selection, pages 178 to 183. Further, the text, Arithmetic Operations of Digital Computers, by R. K. Richards, D. Van Nostrand Co., Inc., Princeton, N.J., 1955, describes several types of delay techniques of which those on pages 326 to 330 are especially suited for use as the recirculating registers involved in this invention.

While the invention has been particularly shown and described with reference to a preferred embodiment thereof, it will be understood by those skilled in the art that the foregoing and other changes in the form and details may be made therein about departing from the spirit and scope of the invention.

What is claimed is:

1. In an information storage and retrieval system including means to convert an analog signal representing the information to a sequence of digits;

a first cyclic store for the digits of the converting means wherein the digits are arranged in interleaved form such that successive digits emitted by the converting means are separated by at least one other set of digits;

a second cyclic store synchronized with said first cyclic store for recirculating a signal indicating the beginning of the digit sequence in said first cyclic store;

a third cyclic store for recirculating a signal indicating the beginning of each set of digits in said first cyclic store;

means responsive to the signal in said second cyclic store to sense the digits of said first cycle store in sequence; and means to convert said sequence of digits to an analog signal.

2. The system of claim 1 wherein said sensing means is responsive to the signals in said second and third cyclic stores.

3. The system of claim 2 wherein the converting means generates digits consisting of combinations of binaries, one combination for each of spaced samplings of the analog signal.

4. An information and retrieval system, comprising:

a plurality of synchronized storage registers, each for a set of digits repersenting quantized analog signals, storage being in interleaved form of subsets of digits;

a homing signal register for identifying the beginnings of said storage registers;

a timing signal register for identifying the beginnings of the subsets of digits in said storage registers;

means to sense in proper sequence the digit sets of preselected storage registers; and means to convert the sensed digits to analog form.

5. The system of claim 4 and addressing means for identifying said storage registers;

and wherein said sensing means comprises gating circuits responsive to the signals of said homing and timing registers and said addressing means.

6. The system of claim 5 wherein each quantum of the analog signal is reprsented by a plurality of digital signals and said converting means includes means to identify corresponding signals in the plurality of signals and weighting means responsive to said identifying means to generate the appropriate analog level for the signals.

7. The system of claim 6 wherein said identifying means comprises gates for energizing said weighting means and means responsive to the signal of said timing register to activate said gates in sequence.

8. The system of claim 7 wherein said converting means includes means to sum the analog levels generated by said weighting means.

9. The system of claim 8 and an integrator to smooth the output of the summing means of said converting means.

References Cited

UNITED STATES PATENTS 3,183,303 5/1965 Clapper -------------- 179—1

OTHER REFERENCES

IBM Tech. Disc. Bull., October 1960, p. 60.

IBM Tech Disc. Bull., November 1963, p. 43.

KATHLEEN H. CLAFFY, *Primary Examiner.*

R. P. TAYLOR, *Assistant Examiner.*